United States Patent [19]

Hendricks et al.

[11] Patent Number: 5,088,689
[45] Date of Patent: Feb. 18, 1992

[54] REMOVABLE DISCHARGE SLEEVE IN A DISK VALVE

[75] Inventors: Fred W. Hendricks, Cerritos, Calif.; Bobby Brooks, Midland, Tex.

[73] Assignee: Automatic Control Components, Inc., Denver, Colo.

[21] Appl. No.: 450,549

[22] Filed: Dec. 14, 1989

Related U.S. Application Data

[63] Continuation of Ser. No. 264,900, Oct. 31, 1988, abandoned.

[51] Int. Cl.⁵ .............................................. F16K 5/00
[52] U.S. Cl. ...................................... 251/304; 251/208
[58] Field of Search ............... 251/205, 304, 108, 122; 137/375

[56] References Cited

U.S. PATENT DOCUMENTS

| | | | |
|---|---|---|---|
| 3,207,181 | 9/1965 | Willis | 251/208 X |
| 4,461,316 | 7/1984 | Cove et al. | 137/312 |
| 4,603,834 | 8/1986 | Nerdlick | 251/121 |
| 4,662,401 | 5/1987 | Zingg et al. | 137/599 X |
| 4,712,574 | 12/1987 | Wolcott et al. | 137/375 |

Primary Examiner—John C. Fox
Attorney, Agent, or Firm—Clifford A. Poff

[57] ABSTRACT

A disk valve construction having relatively movable face to face disk upstream of a sleeve member at an outlet chamber of the valve. The sleeve member includes a truncated conical portion to produce a desired pressure drop, while, at the same time reducing the turbulence of the fluid flow during operation of the valve. The sleeve member is maintained in position by way of pressure of the fluid, thereby avoiding the necessity of epoxy to hold the sleeve member to the valve body. The sleeve can be provided with an end wall with a discharge opening of a predetermined size at the downstream end of the sleeve for producing a predetermined fluid pressure drop.

11 Claims, 3 Drawing Sheets

REMOVABLE DISCHARGE SLEEVE IN A DISK VALVE

This is a continuation of co-pending application Ser. No. 07/264,900, filed on Oct. 31, 1988, now abandoned.

BACKGROUND OF THE INVENTION

1. Field of the Invention

The present invention relates to a valve having relatively movable disk members each with a fluid opening which can be brought into and out of fluid conducting alignment for discharging fluid to a discharge port, and, more particularly, to improvements to such a valve which include a discharge port downstream of the disks formed by a sleeve anchored to the valve body.

2. Description of the Prior Art

This invention relates to a valve having a stationary disk and a rotatable disk mounted in a valve housing in a face-to-face confronting relationship in a pathway for fluid in a valve body. The disks are each provided with at least one orifice or opening to control the flow of fluid through the valve by the size of the holes in the disk as well as the degree of alignment between the holes in the disk. Angular movement of one disk relative to the other in the valve body is accomplished by turning a handle situated outside of the valve body but coupled to produce rotation of the rotatable disk. The rotatable disk can be moved from a full open position wherein the hole or holes in one disk align with the hole or holes in the other disk for providing maximum flow through the valve to a fully closed position wherein the hole or holes in the respective disks are misaligned and blocked by solid portions of the confronting disks.

Valves of this type are particularly useful for controlling the flow of fluids from oil and gas wells and the like. Such a valve is used to control the rate of flow of well production fluids that may contain abrasive containments such as sand particles. Such fluid when entering the valve can be under extreme pressure of the order of, for example, 3000 PSI. The openings in the disks are of a smaller cross-sectional area than either an upstream entry chamber or a downstream discharge chamber that are formed in a valve body. The flow restriction formed by the opening in the disks cause an acceleration of the fluid passing through the openings. The increase to the velocity of the fluid emerging from the opening in the downstream disk enters a discharge chamber which has a cross-sectional area that is greater than the cross-sectional area of the openings in the downstream disk. Because of the construction of the discharge chamber, particularly when formed by a renewable sleeve in the valve body, a large pressure drop in the fluid passing through the sleeve is created. The effect is to reduce the capacity of the valve, and, because of the construction of the removable sleeve, abrupt changes to the configuration of the opening in the sleeve produce turbulence in the fluid, particularly at the outlet of the valve which is unprotected by the renewable sleeve.

In the known form of valves of the type under discussion, the outlet is defined by an oblong transverse configuration immediately downstream of the downstream disk. The oblong configuration is a result of the need to provide openings to receive retainer pins which are used to anchor the disk in the valve body. The area of the oblong configuration is reduced by the thickness of the sleeve when such a protective sleeve is required for the outlet chamber. The reduced oblong area of the sleeve, in turn limits the maximum size of the disk that can be used with the renewable sleeve as compared with, for example, the size of the oblong outlet chamber when a removable sleeve is not used. The smaller volume for conducting fluid in the sleeve creates a larger pressure drop to the fluid passing through the sleeve, and thus reducing the capacity of the valve.

Moreover, in the known form of valves using renewable sleeves at the outlet chamber, the sleeve is adhered to the valve body by an adhesive, such as epoxy cement, which also is relied upon to prevent the flow of fluid between the sleeve and the valve body. When it is necessary to replace the sleeve, the valve body must be heated to a temperature sufficient to soften the epoxy so that the sleeve can be removed. Typically, it is known to heat a valve body to over 250 degrees Fahrenheit in order to effectively soften the epoxy for replacement of the sleeve.

SUMMARY OF THE INVENTION

It is an object of the present invention to provide an improved construction for a disk valve to not only reduce or, alternatively, produce a desired pressure drop to fluid emerging from a valve, but also to reduce turbulence of the fluid, and match the outlet configuration of a sleeve member at the outlet to the configuration of the valve outlet so as to avoid turbulence of the fluid in unprotected outlet areas of the valve body.

It is a further object of the present invention to provide an improved construction of a sleeve member forming a discharge flow path for fluid emerging from the passageway in a disk member within a valve body wherein a chamber is formed between the disk and the valve body to carry a seal to prevent flow of fluid about the outer periphery of the disk member as well as between the sleeve and support surfaces therefor in the valve body.

It is a further object of the present invention to provide a renewable sleeve arrangement to form a discharge chamber in a disk valve wherein fluid emerging from an opening in a disk member enters the discharge chamber formed in a sleeve which includes an end wall with an aperture therein, that is of a predetermined size to bring about a predetermined pressure drop in the sleeve to reduce or eliminate cavitation in the valve, and to direct fluid from the sleeve in a way to prevent damage to the valve body by fluid emerging from the opening in the end wall of the sleeve.

According to the present invention there is provided a valve including the combination of a valve body having an internal cavity with an inlet and outlet for fluid, a rotator spool seated for rotational movement in the cavity of the valve body at a spaced location upstream of the fluid outlet, the rotator spool having a passageway in continuous fluid receiving communication with the inlet for directing fluid to the outlet of the valve body, an upstream disk locked to rotate with the rotator spool in the cavity of the valve body downstream of the rotator spool, the upstream disk having a fluid passageway for conducting fluid from the fluid passageway of the rotator spool, a downstream disk arranged in a face-to-face and confronting relation with the upstream disk in the cavity of the valve body, the downstream disk having a fluid passageway for conducting fluid from the opening in the upstream disk, a removable tubular insert interlocked with the downstream disk while supported by the valve body for conducting fluid from the opening in the downstream disk to the outlet, the tubular insert having a circular transverse cross-section with interlocking supports protruding in the circular configuration of the insert at the downstream side of the downstream disk, means for interlocking the downstream disk member with the tubular insert, and means for rotating the rotator spool while seated in the cavity of the valve body to bring the passageway in the upstream disk and the passageway in the downstream disk into and out of fluid conducting relationship.

When desired, according to the present invention, the renewable tubular insert may include an end wall with a passageway therein to meter the flow of liquid discharged from the tubular insert to the outlet of the valve body. Preferably, the rotator spool is provided with a seal restraint surface having an annular configuration and supported by the rotor spool to avoid frictional contact with a seal between the downstream disk and the valve body, while at the same time the restraint surface forms a limit to the travel for the seal in the event of, for example, a reverse fluid flow or pressure condition. The restraint surface holds the seal in place between the disk and the valve body.

BRIEF DESCRIPTION OF THE DRAWINGS

These features and advantages of the present invention as well as others will be more fully understood when read in light of the accompanying drawings in which.

DETAILED DESCRIPTION OF THE PREFERRED EMBODIMENTS

Figure 1:
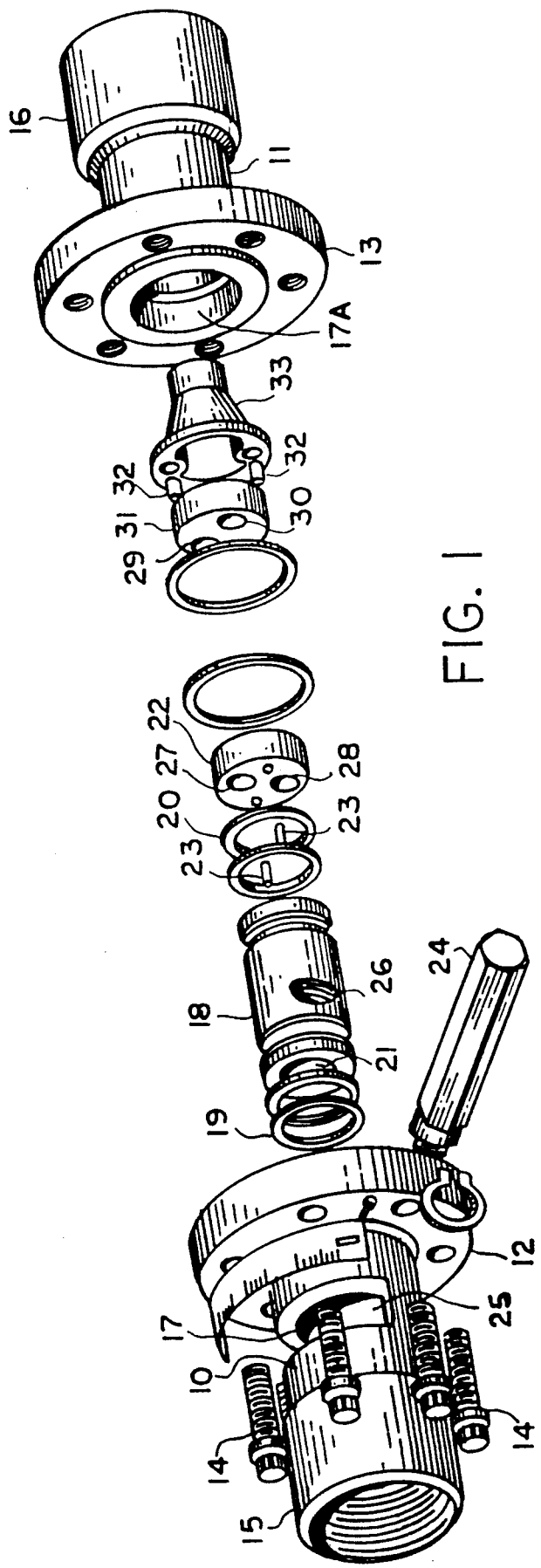
FIG. 1 is an exploded isometric view of a valve embodying features of the present invention.
Figure 2:
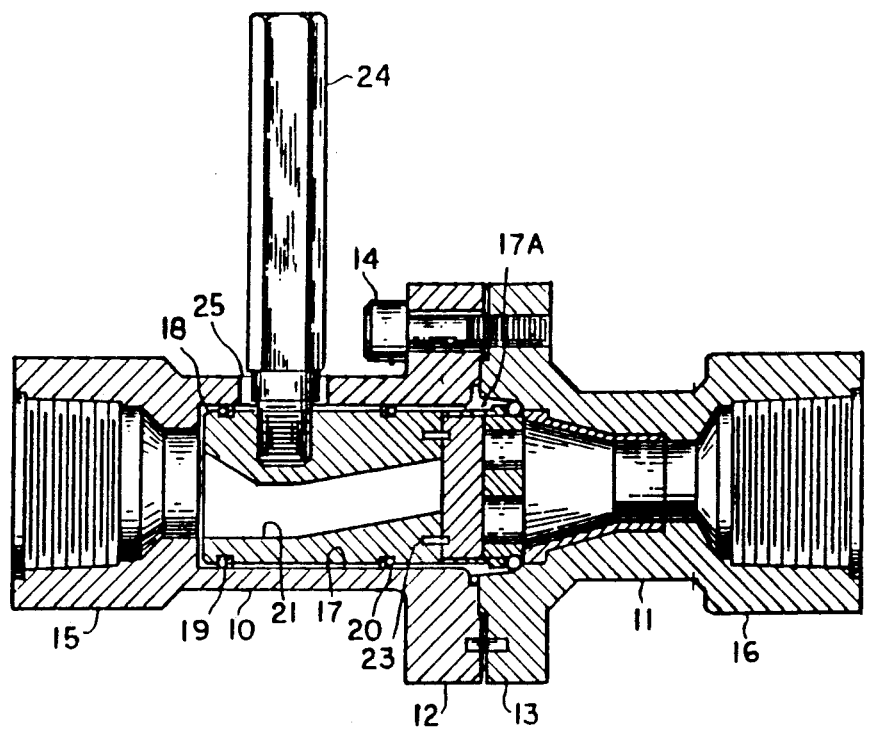
FIG. 2 is a sectional view showing the assembly of parts illustrated in FIG. 1 forming the valve of the present invention.

In FIGS. 1 and 2 there is illustrated a valve which includes a valve body made up of body parts 10 and 11 provided with flanges 12 and 13, respectively. Flange 13 has drilled and tapped holes to receive end portions of bolts 14 that are passed through drilled holes in flange 12 to secure the body parts of the valve together. By this configuration, access can be gained to the interior of the valve for assembly of internal components therein. Valve body part 10 includes an inlet portion formed by an enlarged hub 15 having internal threads formed in the hub for receiving a corresponding threaded end portion of a pipe. Similarly, valve body part 11 is provided with an enlarged hub 16, having an internally threaded portion which can receive the threaded end of a pipe for the discharge of fluid from the valve.

As can be best seen in FIG. 2, the inlet formed by hub 15 extends to a cylindrical cavity 17 in body part 10. A rotor spool 18 is positioned in the cylindrical cavity 17, and O-rings 19 and 20 mounted in grooves formed in the rotor spool near the terminal ends thereof form a fluid tight seal with the valve body to prevent the passage of fluid between the rotor spool and the valve body. Fluid supplied to the valve from the inlet can pass through a passageway 21 in the rotor spool 18. In this embodiment the passageway 21 extends in the longitudinal direction along the length of the spool. At the end of the spool 18 which faces toward the valve outlet, the cavity 17 extends beyond the end of the spool and a cavity 17A is formed as an extension of the cavity 17 in body part 11. A floating disk 22 is drivingly interlocked with the rotor spool 18 by pins 23 which extend into openings in the disk 22 and into openings in the end face of rotor spool 18. The spool 18 can be rotated by a control handle 24, which is provided with a threaded end portion that can pass through an annular slot 25 in valve body part 10, where the threaded end portion of handle 24 engages in a threaded opening 26 formed in the spool 18. It will be observed that the slot 25 is situated in the valve body between the support sites for the two O-rings. By rotating the spool through operation of the handle, the spool rotates about an axis corresponding to the longitudinal axis of the spool. The rotation of the spool 18 imparts a rotary movement to the disk 22 such that in the embodiment shown in FIGS. 1 and 2, openings 27 and 28 of disk 22 can be moved into and out of alignment or registration with corresponding openings 29 and 30 in a disk 31. The disk 31 is held in a stationary manner relative to the housing part 11 by anchor pins 32, which, as best shown in FIG. 1, are received in drilled openings formed in the disk 31 and other openings aligned therewith and formed in a replaceable sleeve 33.

Figure 4:
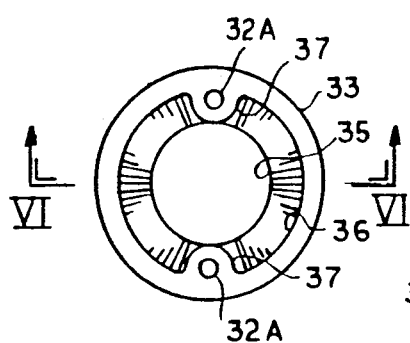
FIG. 4 is a front plan view of the sleeve member shown in FIG. 3.
Figure 3:
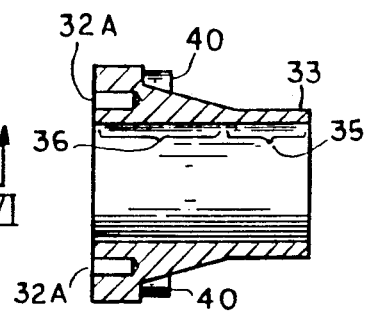
FIG. 3 is a transverse sectional view of a sleeve member at the discharge chamber of the valve shown in FIGS. 1 and 2.
Figure 5:
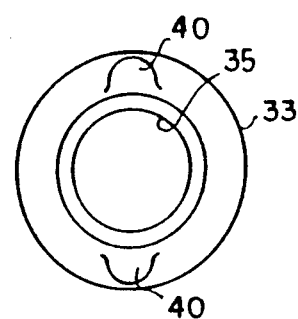
FIG. 5 is a rear plan view of the sleeve shown in FIG. 3.
Figure 6:
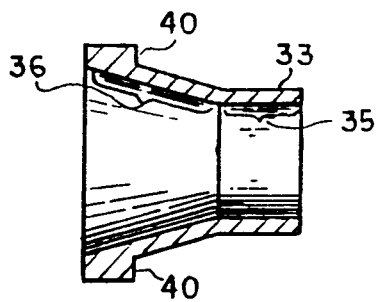
FIG. 6 is a sectional view taken along lines VI—VI of FIG. 4.

The sleeve 33 as shown in FIGS. 3-6, according to the present invention is made up of an annular discharge section 35 of which upstream thereof is a generally truncated right circular conical section 36. The section 36, as can be best seen in FIG. 4, is provided with protruding sections 37 that extend into the conical configuration of the section at the entrance end of the sleeve. These protruding sections form sites where holes 32A are formed to hold anchor pins 32. The transverse area of the sleeve along its length is maximized for capacity to carry the largest possible volume of fluid discharged from the valve. In this way, a lower pressure drop is largely responsible due to the taper provided by the truncated conical portion of the sleeve. The taper reduces turbulence and the tubular outlet of annular discharge section 35 of sleeve 33 is designed to match the outlet of the valve body to prevent unwanted turbulence in the unprotected or unlined portion of the valve body. As can be seen from FIGS. 3, 5, and 6, on the outside of the sleeve 33 there are provided anchor lugs 40 at diametrically opposite sides of the sleeve. The anchor lugs are protrusions on the outside surface of the sleeve which interlock with recesses but shown in FIG. 2 formed in the sleeve seating surface of valve body at the discharge outlet side of the disk 31. The sleeve of the present invention is designed to avoid and eliminate the need for epoxy or other adhesive to hold the sleeve to the valve body. The sleeve 33 is retained against the seating surface in the valve body by pressure of the fluid exerted on the valve body at the inlet end. It can be seen from FIG. 2 that the pressure of the fluid applied to the spool whether in a position for delivering fluid to the discharge portion or not, undergoes a pressure drop due to the smaller passageway for fluid through the spool. The pressure differential, or pressure of fluid blocked by the disks applies a force sufficient to hold the disks in their confronting face-to-face relation, and, at the same time, press the sleeve against the valve under a sufficient force to maintain a seated relationship.

Figure 7:
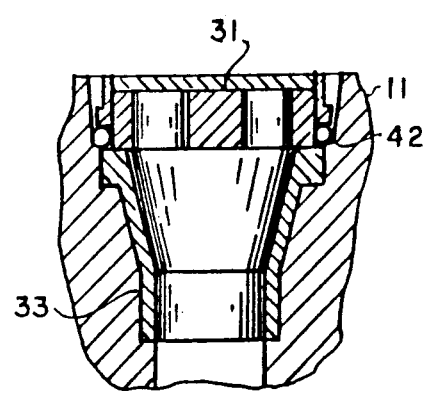
FIG. 7 is an enlarged view in section to illustrate the relationship between a downstream disk and the sleeve shown in FIGS. 3-6.

As best shown in FIG. 7, in order to prevent unwanted flow of fluid between the sleeve and the valve housing, there is provided an O-ring 42 which is seated in a gap formed between the outer circumferential face surface of disk 31 and the wall of the valve housing part 11. The relationship of the O-ring is such that the O-ring is seated at the parting line between the sleeve 33 and the valve shelf surface of housing 11.

Figure 10:
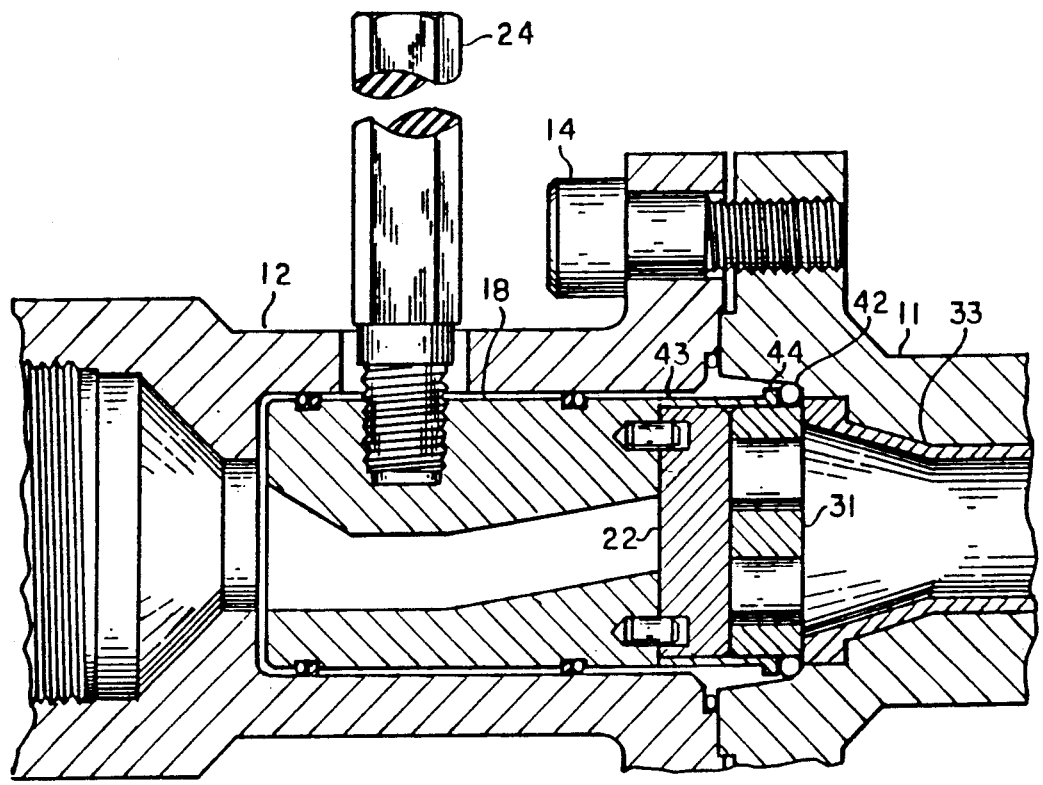
FIG. 10 is an enlarged view similar to FIG. 2, but illustrating a preferred embodiment of the rotor spool for the valve of the present invention.

A preferred embodiment of the present invention, as shown in FIG. 10, the O-ring 42 is retained in close proximity to its desired sealing site by cylindrical extension 43 to the rotator spool 18. The cylindrical section 43 is provided with a relatively thin wall section extending to thickened restraint section 44 which is an enlargement on the outside diameter of section 43. The end face of restraint section 44 is sufficiently broad enough to entrap the O-ring 42 and prevent unwanted displacement away from its intended sealing site. The extension of the rotor spool serves further to facilitate assembly of the valve by holding the disks 22 and 31 in their confronting face-to-face relationship with the upstream disk 22 being locked by the pins 23 to the rotor spool. In the normal operation of the valve, the inlet pressure is higher than the outlet pressure, thus allowing fluid to flow from the inlet to the outlet. The flow is controlled by the relative positions of the openings 27, 28, 29, and 30 in the two disks. The O-ring 42 is held in place by friction and differential pressure urging the O-ring toward the low pressure side of the valve. In the past, sudden changes in the downstream conditions for the fluid, such as a valve closing or a sudden drop in flow conditions will cause a hydraulic hammer, resulting in a momentary pressure pulse in the outlet that is higher than the fluid pressure in the inlet. This pressure pulse can be large enough, in some instances, to unseat the seal provided by the O-ring. Once the O-ring sealing has been disrupted, the normal operation of the valve will allow a fluid flow, although small, between the disk sidewalls and the cavity formed in the valve body. The material used to form the valve body normally cannot withstand the abrasive cutting action caused by the by-pass flow of fluid and thus, irreparable damage will occur. In other instances, a deliberate back-flush of fluid is caused to occur for any one of numerous reasons. Hence, there is established a flow of fluid through a valve in a reverse direction, i.e., outlet to inlet, the result is the same as the result produced by a hydraulic hammer. To correct this, the extension to the rotor spool, as described above, avoids the unseating of the sealing O-ring 42. The restraint established by the extension can be provided by dimensioning the extension to prevent rubbing or friction during adjustment of the valve for normal operation and to form a limit of travel for the O-ring 42. If a reverse flow or pressure change in the reverse direction occurs, the sealing O-ring 42 moves only as far as allowed by the restraint provided by the extension to the rotor spool. The extent of movement is such that the O-ring 42 is retained in place between the disk and the valve body so that when normal pressure flow conditions are restored to the valve, the O-ring immediately assumes it proper sealing relationship. Provision of an extension to the rotor spool offers the further advantage that the O-ring 42 which must be wedged tightly in place, uniformly about the periphery of the disk can be achieved without the need for special implements. In the past when the O-ring 42 was placed in the sealing site, it was common to wedge the seal through the use of a pointed blade, such as a screw driver. Good uniform seating of the O-ring could not be achieved. However, with the provision of the extension to the spool, an automatic continuous seating of the O-ring is provided. It is to be understood, however, that the retention function of the cylindrical extension of the spool can be achieved by providing, for example, an extension to the housing part 12 arranged to protrude into the opening formed in housing part 11 for receiving the disks.

Figure 8:
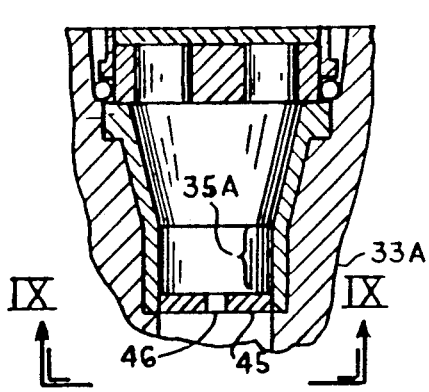
FIG. 8 is a sectional view similar to FIG. 7 and illustrating an embodiment of sleeve member to achieve a predetermined pressure drop at the discharge of the valve.
Figure 9:
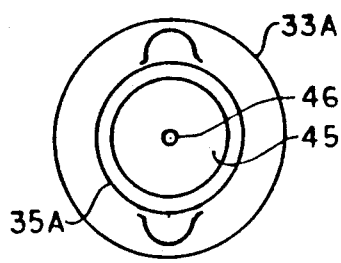
FIG. 9 is an end view taken along lines IX—IX of FIG. 8.

In FIGS. 8 and 9 there is illustrated a further embodiment of the discharge sleeve, in which the sleeve 33A is provided with a transverse end wall 45 at the discharge end of the cylindrical tubular portion 35A of the sleeve. The end wall 45 is provided with an opening 46 to conduct fluid from the sleeve to the discharge outlet opening. Opening 46 is dimensioned, as seen in FIGS. 8 and 9, to be of lesser transverse area than the transverse area of the fluid-conducting passage area of the cylindrical tubular portion 35A of the sleeve so as to achieve a predetermined pressure drop in the valve. This fixed pressure drop is in addition to a variable pressure drop that occurs through the flow control operation of the disks. The size of the opening 46 will be selected according to the specific application to which the valve has been assigned. Thus, the opening 46 will be sized and drilled according to predetermined requirements. In this way, it is possible to produce two pressure drops within the valve and thereby reduce or eliminate cavitation in the valve. By situating the opening in the end wall 45 at the geometrical center of the end wall, any turbulence or cavitation is isolated in the center of the outlet which avoids adverse effects caused by cavitation at the walls of the outlet.

While the present invention has been described in accordance with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment but rather construed in breadth and scope in accordance with the recitation of the appended claims.

We claim:
1. A valve including the combination of:
   a valve body having an internal cavity with an inlet and outlet for fluid;
   a rotator spool seated for rotational movement in the cavity of said valve body at a spaced location upstream of the fluid outlet, said rotator spool having a passageway in continuous fluid receiving communication with the inlet for directing fluid to the outlet of the valve body;
   an upstream disk locked to rotate with said rotator spool in the cavity of said valve body downstream of said rotator spool, said upstream disk having a fluid passageway for conducting fluid from the fluid passageway of said rotator spool;

a downstream disk arranged in a face-to-face and confronting relation with said upstream disk in the cavity of said valve body, said downstream disk having a fluid passageway for conducting fluid from the fluid passageway in said upstream disk;

a tubular insert interlocked with said downstream disk while supported in said valve body for conducting fluid from the fluid passageway in the downstream disk to said outlet said tubular insert including a cylindrical fluid discharge portion and upstream thereof a truncated right circular conical portion for receiving fluid from said downstream disk, said truncated right circular conical portion having protruding lug sections extending outwardly from an outside surface thereof and forming anchor sites for interlocking said tubular insert with said valve body; and means for rotating said rotator spool while said rotator spool is seated in the cavity of the valve body to bring the passageway in the upstream disk and the passageway in the downstream disk into and out of fluid conducting relationship.

2. The valve according to claim 1 further including recess means formed in a seating surface provided in said valve body for receiving said protruding lug sections and for interlocking said tubular insert against rotation relative to said valve body.

3. The valve according to claim 1 further including means for preventing flow of fluid between said tubular insert and said valve body.

4. The valve according to claim 3 wherein said means for preventing flow of fluid includes an O-ring.

5. The valve according to claim 4 further including means for preventing dislodgement of said O-ring from a seated sealing condition between the valve body and the tubular insert.

6. The valve according to claim 8, wherein said means for preventing dislodgement includes a wall section projecting from said rotator spool.

7. A valve including the combination of:
a valve body having an internal cavity with an inlet and outlet for fluid;
a rotator spool seated for rotational movement in the cavity of said valve body at a spaced location upstream of the fluid outlet, said rotator spool having a passageway in continuous fluid receiving communication with the inlet for directing fluid to the outlet of the valve body;
an upstream disk locked to rotate with said rotator spool in the cavity of said valve body downstream of said rotator spool, said upstream disk having a fluid passageway for conducting fluid from the fluid passageway of said rotator spool;
a downstream disk arranged in a face-to-face and confronting relation with said upstream disk in the cavity of said valve body, said downstream disk having a fluid passageway for conducting fluid from the fluid passageway in said upstream disk;
a tubular insert interlocked with said downstream disk while supported in said valve body for conducting fluid from the fluid passageway in the downstream disk to said outlet, said insert including a fluid discharge portion and a transverse end wall at a fluid discharge end of said fluid discharge portion, said transverse end wall having an opening of predetermined size therein for achieving a predetermined pressure drop in a fluid conducted by said tubular insert to said outlet, said opening of predetermined size being of lesser transverse area than a fluid-conducting passage of said tubular discharge portion, said predetermined pressure drop being in addition to a variable pressure drop in said fluid occurring through flow control operation of said disks;
means for interlocking said tubular insert with said valve body;
means for interlocking said downstream disk with said tubular insert; and
means for rotating said rotator spool while said rotator spool is seated in the cavity of the valve body to bring the passageway in the upstream disk and the passageway in the downstream disk into and out of fluid conducting relationship.

8. A valve including the combination of:
a valve body having an internal cavity with an inlet and outlet for fluid;
a rotator spool seated for rotational movement in the cavity of said valve body at a spaced location upstream of the fluid outlet, said rotator spool having a passageway in continuous fluid receiving communication with the inlet for directing fluid to the outlet of the valve body;
an upstream disk locked to rotate with said rotator spool in the cavity of said valve body downstream of said rotator spool, said upstream disk having a fluid passageway for conducting fluid from the fluid passageway of said rotator spool;
a downstream disk arranged in a face-to-face and confronting relation with said upstream disk in the cavity of said valve body, said downstream disk having a fluid passageway for conducting fluid from the fluid passageway in said upstream disk;
a tubular insert interlocked with said downstream disk while supported in said valve body for conducting fluid from the fluid passageway in the downstream disk to said outlet;
means for interlocking said downstream disk with said tubular insert;
said tubular insert including a truncated right circular conical portion and having a circular transverse cross section, said tubular insert further being formed with means protruding into an interior conical configuration of said truncated right circular conical portion for receiving said means for interlocking said downstream disk with said tubular insert, said means for interlocking said downstream disk with said tubular insert comprising means projecting into both said downstream disk and said means for receiving; and
means for rotating said rotator spool while said rotator spool is seated in the cavity of the valve body to bring the passageway in the upstream disk and the passageway in the downstream disk into and out of fluid conducting relationship.

9. A valve including the combination of:
a valve body having an internal cavity with an inlet and outlet for fluid;
an upstream disk rotatably supported in the cavity of said valve body and having a fluid passageway for conducting fluid;
means for rotating said upstream disk;
a downstream disk arranged in a face-to-face and confronting relation with said upstream disk in the cavity of said valve body, said downstream disk having a fluid passageway for conducting fluid from the fluid passageway in said upstream disk;

a tubular insert interlocked with said downstream disk while supported in said valve body for conducting fluid from the fluid passageway in the downstream disk to said outlet;

means for interlocking said tubular insert with said valve body;

means for interlocking said downstream disk with said tubular insert;

said tubular insert including a truncated right circular conical portion and having a circular transverse cross section, said tubular insert further being formed with means protruding into an interior conical configuration of said truncated right circular conical portion for receiving said means for interlocking said downstream disk with said tubular insert, said means for interlocking said downstream disk with said tubular insert comprising means projecting into both said downstream disk and said means for receiving.

10. The valve according to claim 9 wherein said tubular insert further includes a fluid discharge portion downstream of said right circular conical portion, said fluid discharge portion having a transverse end wall at a fluid discharge end thereof, said transverse end wall having an opening of predetermined size therein for achieving a predetermined pressure drop in a fluid conducted by said tubular insert to said outlet, said opening of predetermined size being of lesser transverse area than a fluid-conducting passage of said fluid discharge portion, said predetermined pressure drop being in addition to a variable pressure drop in said fluid occurring through flow control operation of said disks.

11. The valve of claim 14 wherein said truncated right circular conical portion of said tubular insert has protruding lug sections extending outwardly from an outside surface thereof and forming anchor sites for interlocking said tubular insert said valve body.

* * * * *